(12) United States Patent
Atkins et al.

(10) Patent No.: US 9,442,562 B2
(45) Date of Patent: Sep. 13, 2016

(54) SYSTEMS AND METHODS OF IMAGE PROCESSING THAT ADJUST FOR VIEWER POSITION, SCREEN SIZE AND VIEWING DISTANCE

(75) Inventors: Robin Atkins, Vancouver (CA); Neil W. Messmer, Langley (CA); Scott Daly, Kalama, WA (US); Mahdi Nezamabadi, Moorestown, NJ (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 320 days.

(21) Appl. No.: 13/474,693

(22) Filed: May 17, 2012

(65) Prior Publication Data

US 2012/0299817 A1 Nov. 29, 2012

Related U.S. Application Data

(60) Provisional application No. 61/491,021, filed on May 27, 2011.

(51) Int. Cl.
  *G06F 3/01* (2006.01)
  *G02B 27/00* (2006.01)
  *G06F 3/042* (2006.01)
  *H04N 13/04* (2006.01)

(52) U.S. Cl.
  CPC ........... *G06F 3/011* (2013.01); *G02B 27/0093* (2013.01); *G06F 3/0425* (2013.01); *H04N 13/0475* (2013.01); *H04N 13/0477* (2013.01); *H04N 13/0497* (2013.01); *G09G 2320/028* (2013.01); *G09G 2320/0626* (2013.01); *G09G 2354/00* (2013.01); *H04N 13/047* (2013.01); *H04N 13/0429* (2013.01); *H04N 13/0438* (2013.01)

(58) Field of Classification Search
  None
  See application file for complete search history.

(56) References Cited

U.S. PATENT DOCUMENTS

| | | | |
|---|---|---|---|
| 5,805,201 A | 9/1998 | Fujiwara | |
| 7,108,379 B2 | 9/2006 | Tan | |
| 7,113,159 B2 | 9/2006 | Sawabe | |
| 2006/0061652 A1* | 3/2006 | Sato | H04N 13/0429 348/53 |
| 2007/0247717 A1* | 10/2007 | Konno et al. | 359/613 |
| 2007/0285569 A1 | 12/2007 | Nakamura | |
| 2010/0054623 A1 | 3/2010 | Kobiki | |

(Continued)

FOREIGN PATENT DOCUMENTS

| | | |
|---|---|---|
| CN | 101079972 | 11/2007 |
| EP | 1560428 | 8/2005 |

(Continued)

OTHER PUBLICATIONS

Kishimoto, K., et al., "Appropriate Luminance of LCD Television Screens under Real Viewing Conditions at Home" vol. 64, No. 6, pp. 881-890, published on Jun. 2010.

(Continued)

*Primary Examiner* — Kenneth B Lee, Jr.

(57) ABSTRACT

Several embodiments of image processing systems and methods are disclosed herein whereby at least one characteristic of an image displayed on a target display is changed according to information regarding the viewer's position—e.g. distance to the target display, the visual angle the target display's subtends of the viewer's field of view. In one embodiment, luminance and/or contrast may be changed depending on the information regarding viewer's position relative to the target display.

25 Claims, 7 Drawing Sheets

(56) References Cited

U.S. PATENT DOCUMENTS

| | | | |
|---|---|---|---|
| 2010/0182350 A1 | 7/2010 | Fujine et al. | |
| 2010/0295877 A1 | 11/2010 | Yun | |
| 2011/0081132 A1 | 4/2011 | Iwata | |
| 2011/0157169 A1* | 6/2011 | Bennett et al. | 345/419 |
| 2011/0292042 A1* | 12/2011 | Vaganov | B44D 2/002 |
| | | | 345/419 |
| 2012/0182276 A1* | 7/2012 | Kee | 345/207 |
| 2012/0236133 A1* | 9/2012 | Gallagher | H04N 13/0018 |
| | | | 348/60 |

FOREIGN PATENT DOCUMENTS

| | | |
|---|---|---|
| GB | 2467898 | 8/2010 |
| IN | 1756/KOL/2008 | 4/2010 |
| JP | 3-187687 | 8/1991 |
| JP | 4-046652 | 2/1992 |
| JP | 4-077440 | 3/1992 |
| JP | 2003-271276 | 9/2003 |
| JP | 2007-322850 | 12/2007 |
| JP | 2008-268327 | 11/2008 |
| KR | 10-2001-0019032 | 3/2001 |
| KR | 10-2004-0078280 | 9/2004 |

OTHER PUBLICATIONS

Johnson, G., et al., "Size Matters: The Influence of Viewing Distance on Perceived Spatial Frequency and Contrast" 13th color Imaging Conference Final Program and Proceedings, published on Nov. 2005.

Fujine, T., et al. "The Relationship Between Prefererred Luminance and TV Screen Size" vol. J91-A, No. 6, pp. 630-638, Jun. 2008.

Choi, S. Y., et al. "Colour Appearance Change of a Large Size Display Under Various Illumination Conditions" Proc. of SPIE-IS&T Electronic Imaging, SPIE vol. 6493, Jan. 2007.

Nezamabadi, M., et al., "An Investigation of the Effect of Image Size on the Color Apperance of Softcopy Reproductions Using a Contrast Matching Technique" Proc. of SPIE-IS&T Electronic Imaging, SPIE vol. 6493, 2007.

Nezamabadi, M., et al. "An Investigation of the Effect of Image Size on the Color Apperance of Softcopy Reproductions" Society for Imaging Science and Technology, pp. 126-129, 2006 International Congress of Imaging Science.

Nezamabadi, Mahdi "The Effect of Image Size on the Color Apperance of Image Reproductions" May 2008.

\* cited by examiner

SYSTEMS AND METHODS OF IMAGE PROCESSING THAT ADJUST FOR VIEWER POSITION, SCREEN SIZE AND VIEWING DISTANCE

CROSS-REFERENCE TO RELATED APPLICATIONS

This application claims priority to U.S. Provisional Patent Application No. 61/491,021 filed 27 May 2011, which is hereby incorporated by reference in its entirety.

TECHNICAL FIELD

This invention relates to image processing, and more particularly to improved image processing systems and methods that change certain characteristics of image data based on information related to viewer's distance from image and the visual angle of the image.

BACKGROUND OF THE INVENTION

Studies have shown that both physical screen size and the visual angle of an image displayed thereon have an effect on the perceived luminance, contrast and color appearance. Some rules of thumb are known to display engineers. For example, an image displayed on a larger screen appears in general brighter and with lower contrast than if the same image were displayed on a smaller screen. In addition, if the viewer is closer to a given screen (i.e. the visual angle of the image is larger), then the image appears brighter and with lower contrast.

As people begin to consume video content on a larger range of screen sizes, this effect plays a greater and greater role in the appearance of colors and tones. It may be desirable to have an image processing system and/or methods that utilize and/or compensate for these known effects to advantageous purposes.

SUMMARY OF THE INVENTION

Several embodiments of image processing systems and methods are disclosed herein whereby at least one characteristic of an image displayed on a target display is changed according to information regarding the viewer's position—e.g. distance to the target display, the visual angle the target display's subtends of the viewer's field of view. In one embodiment, luminance and/or contrast may be changed depending on the information regarding viewer's position relative to the target display.

In one embodiment of the present application, a method for changing at least one characteristics of an image, said image being displayed on a target display, based upon the position data of at least one viewer of said target display is provided. The steps of said method comprising: obtaining information regarding viewer position in relation to the target display; determining if viewer position is within an acceptable range for current characteristics of the image displayed on the target display; and changing at least one characteristic of said image, if viewer position is not within an acceptable range, wherein said change is based upon the viewer's position in relation to the target display.

Other features and advantages of the present system are presented below in the Detailed Description when read in connection with the drawings presented within this application.

DETAILED DESCRIPTION OF THE INVENTION

Overview

Several embodiments of the invention discloses various systems and methods to account for or otherwise change image data based upon certain information relative to the showing of the image to a viewer. Such information may comprise the distance of a viewer to an image, the visual angle that the image forms from the viewer's perspective, and the like. Based upon such information, embodiments of the present system may change the image data to be displayed according to several image characteristics—e.g. luminance, contrast and color data.

In one embodiment, the present system might account for the screen size at an end consumer display, adjusting the colors and tones of an image to preserve the appearance of how it was created and approved in post-production. In one embodiment, the present invention is configured to operate in conjunction with a color management solution. This may be accomplished, for example, by calculating luminance and/or color changes and providing the changes to an API of the color management system. In one embodiment the invention is configured to work with the Dolby color management solutions, but could also be a standalone system for certain applications.

Detection of Viewing Distance and Viewing Angle

One aspect of a present embodiment is to determine the relative angular size of the screen based on the physical screen size and/or the viewer's distance to the screen. Physical screen size can simply be stored in RAM or some other configuration table. The viewing distance can be determined in a number of ways: for example, viewing distance can be assumed as a standard distance (as in default values), or entered by the user during a one-time setup procedure as they install it into their viewing environment, or dynamically detected. Several methods exist to detect viewer position and distance, for example, detecting the infrared signal of viewers in a room or audience, use of proximity sensors, and the use of InfraRed (IR) depth map extraction techniques are fairly well-known in the art. High precision is not necessary, viewing distance to the nearest ½ meter may probably suffice. For multiple viewers, the average viewing distance can be used. If the viewing distance is changing rapidly, it may be desirable to temporally smooth the distance to prevent noticeable adjustments to the image. This could be on the order of several seconds.

Figure 1A:
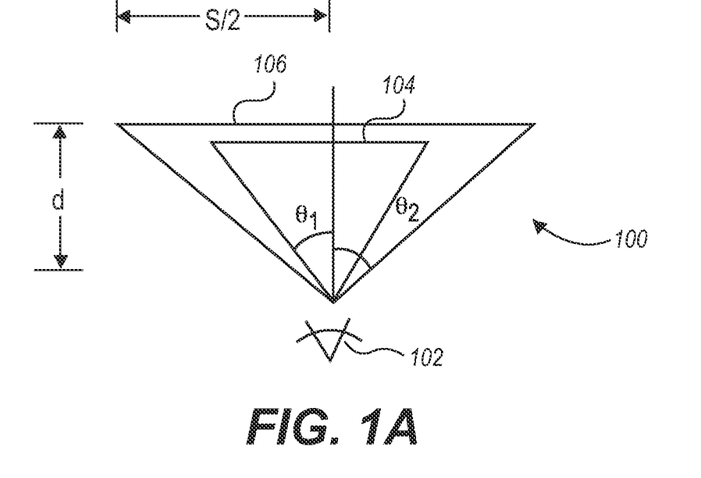
FIG. 1A is top view of an image displayed on two different screens having different horizontal sizes where the viewer is at a same given distance to the screens.
Figure 1B:
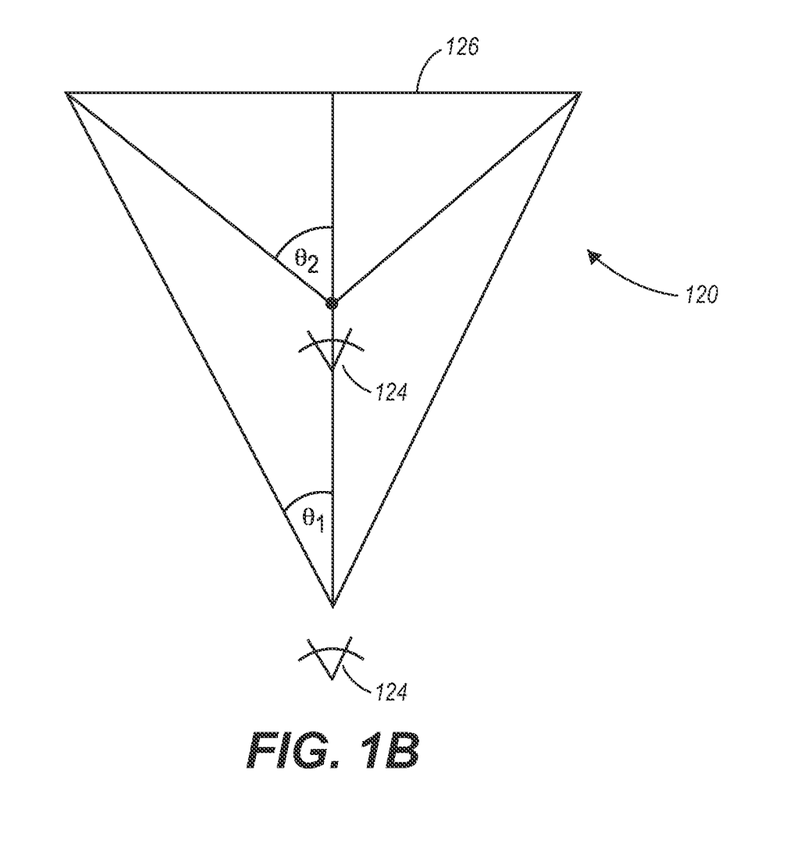
FIG. 1B is a top view of an image displayed on two different screens where the two screens occupy the same visual angle where one screen is at a greater distance to the viewer.

FIGS. 1A and 1B illustrate certain geometrical aspects and considerations of the present system. FIG. 1A is a top view of a viewer (102) in a space (100) where there two screens (104 and 106 respectively) might be displaying an image. As the horizontal dimensions of screens 104 and 106 differ, the viewing angle displacement of the image differs accordingly to viewer 102. As the rules of thumb described above generally apply, the image displayed on screen 104 would appear dimmer and with higher contrast than it would if viewed on screen 106.

FIG. 1B is a top view of two viewers (122 and 124 respectively) in a space (120—e.g. such as a movie theatre or a large home viewing room) viewing a screen (126). The two viewers 122 and 124 are displaced differently with respect to the screen—which, in turn, gives each viewer a different visual angle displacement of screen 126. As between these two viewers, viewer 124 experiences an image that is brighter and having lower contrast than the image perceived by viewer 122.

One method to represent the screen size is by the difference between the relative screen size to the viewer and the absolute screen size. The relative screen size to the viewer can be specified by R=a tan (S/(2d)) where R is the relative screen size, S is the absolute horizontal screen size and d is the distance from screen to viewer, as is shown in FIG. 1A. It will be appreciated that R represents the angular measures, variously labeled Θ, in the figures.

In addition to calculating the relative screen size at the target display, it may be desirable to consider other factors—such as a defined or given relative screen size of the source display as well as notions of whose appearance it is desired are trying to preserve. This could be defined in a specification to correspond to a theatre, or to a color grading display in a post-production environment, or could be included with the bit stream as metadata.

For example, in one embodiment, it may be desired to match the appearance between two screens of different size. In such a case, the "source" screen is the screen that the content was created for, and the "target" screen is the one showing the content to a viewer. If they are the same size, then there may not be a need to do anything. If they are different sizes, then it may be desirable for the image to appear the same on the "target" screen as it appeared on the "source" screen. This matching helps to improve image quality for an "intended" relative size of a target screen or an "intended" distance to a target screen.

Continuing with this embodiment, consider in FIG. 1A that 106 is the "source" and "104" is the "target". It may be desirable to modify the image displayed on 104 to account for the difference in screen sizes. To do this, some knowledge about the "relative size" of both source and target should be used.

There are several options for how to derive the relative size of the "source" screen. Each of these is like metadata that correlates to the relative size in one manner or another:

(1) Metadata that explicitly gives the relative size;
(2) Metadata that labels the source as a certain category (cinema, home, mobile, etc.);
(3) Make an assumption about the source (assume theatre, for example).
(4) Define a "canonical" screen size for the interchange of video data. If video is produced on a different screen size, it should be converted into the canonical screen size for distribution using techniques in this application. At the receiving end, the video should be converted from the canonical screen size into the actual screen size. This method may employ two separate conversions, but may have the advantage of not requiring any metadata or assumptions (which could be wrong).
(5) Analyze the video to guess at the viewing environment, or look it up in an online database.
(6) Metadata that explicitly gives the viewing distance for which the content was approved. This could be the physical distance or a multiple of screen height.

Application to Movie Theaters and Large Viewing Rooms

Figure 2:
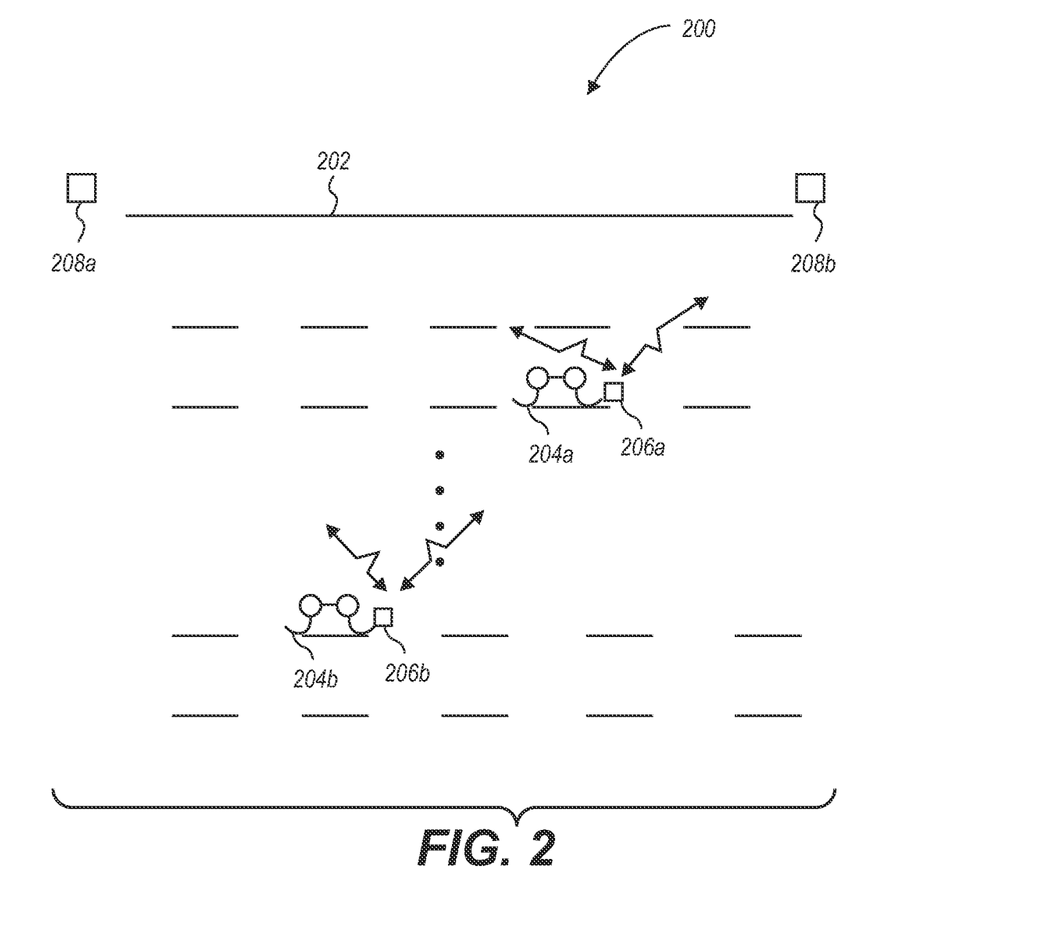
FIG. 2 is a top view of movie theatre where viewers are wearing active glasses for 3-D viewing where the distance of each viewer is calculated from the movie screen.

In addition to the methods and means mentioned above for ascertaining viewer distance, d, to the screen, there is another aspect of one embodiment that applies to movie theatres and large home viewing rooms. FIG. 2 shows a top view of a movie theatre (or a large viewing room) (200) where a plurality of viewers is seated around a screen (202) at various distances within theatre 200. Each viewer may be wearing a pair of active glasses (e.g. for 3-D viewing or other desired special effects)—204a and 204b, respectively. On the active glasses, there are communication and/or computing modules (206a and 206b respectively). Modules 206a and 206b may be in communications with a plurality of communication ports—for example, 208a and 208b—which may be used to send and/or receive signals by and between ports 208 and modules 206. Such signals may be used to obtain position data of each such viewer in relation to the screen—e.g. by way of triangulation or any other known means of distance and/or position detection.

Once distance information is computed or otherwise derived for each viewer, computing module may then create signals to alter the luminance, contrast or other visual aspect of the image as it is modulated by the active glasses, in order to compensate or otherwise alter the perceived image as described herein or otherwise desired by the designers of the present system.

It will be appreciated that the communications module and the computing module do not necessarily have to be co-located on the active glasses. In fact, computing module may be located anywhere in the room (including on the active glasses) as long as signals needed to affect the desired operation of the active glasses are received by the active glasses. In addition, communication module may be affected by any known communication means or methods known, including any wireless or wired scheme.

In one alternative embodiment, it is possible that ports 208 might be part of a visual location system whereby ports 208 may visually identify members of the audience, calculate or otherwise determine viewer's position, and send image processing signals to viewer's active glasses. For the purpose of several embodiments of the present system, it may be sufficient for the system to determine viewer's distance and/or visual angle and affect image processing based on such distance and/or visual angle data. In yet another embodiment, sensors could be embedded in the theatre seats which would allow a determination of viewer distance.

Image Processing Module and Methods

As a result of the viewer's position and/or visual angle, image processing may be affected to correct for changes to several perceived characteristics of the image, as perceived by a typical viewer. As previously mentioned, several rules of thumb are known by display engineers that pertain to changes in perceived images as a result of viewer position and/or visual angle. This effect is believed to be an artifact of the human visual system; but whatever the true causes as to the changes in perception, the present system affects changes in several image characteristics to preserve image integrity, as might be defined or envisioned by the author of the image content, proprietor of the theatre, manufacturer of the display, or even the viewers themselves.

Figure 3:
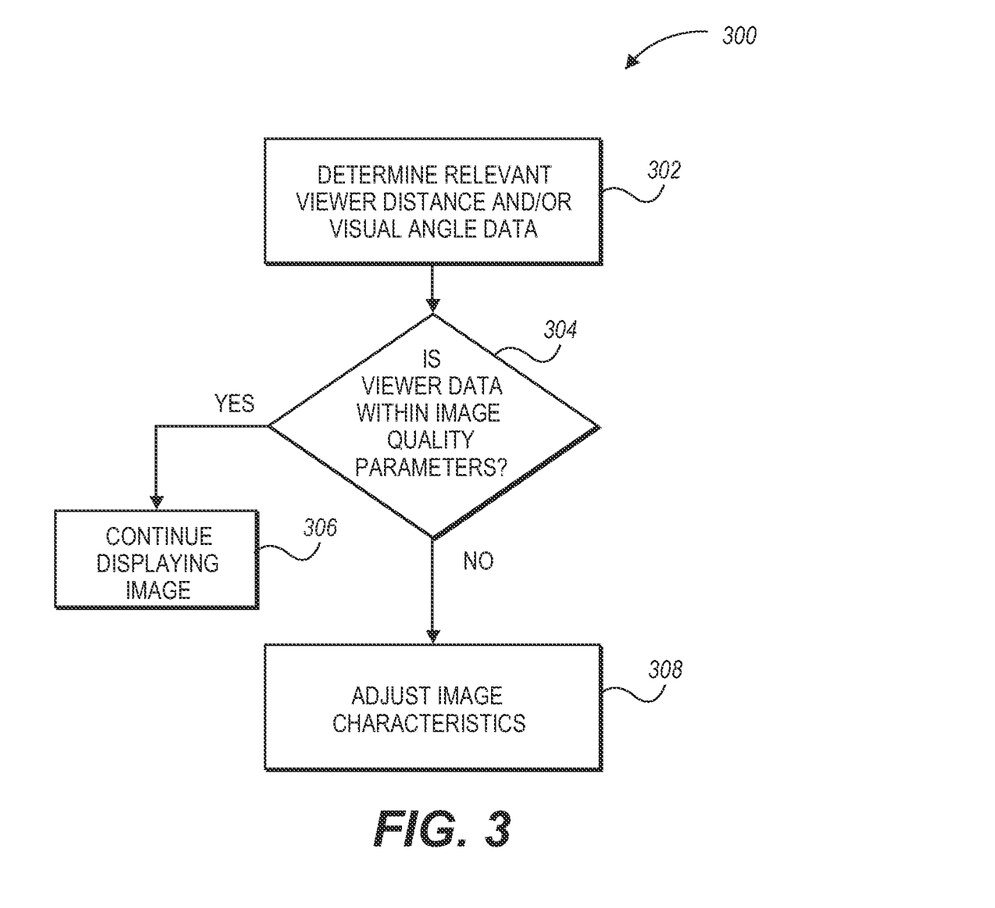
FIG. 3 is a flowchart showing one embodiment of an image processing module made in accordance with the principles of the present invention.

FIG. 3 is a flow chart of one embodiment of the present system that affects such image processing. Processing 300 determines the relevant viewer position, distance and/or visual angle at step 302. This viewer data may be determined or ascertained in any of the ways that are mentioned herein.

After the relevant viewer information has been determined or ascertained, processing 300 queries whether the viewer data is within image quality parameters at step 304. Image quality parameters may be determined by several disparate sources, either working in concert or individuals. As mentioned, one such source of image quality parameters may be set by the author of the image content. For example, a director or video editor may set desired characteristics, such as luminance (either perceived or actual), image contrast (perhaps within a single frame of image or over a sequence of image frames) and/or color rendering (within a single frame, over a sequence of image frames, or to have protected color rendering for certain recurring regions or objects). Other sources of image quality parameters could be owners of theatres, designers of large home viewing areas, manufacturers of display devices, or viewers themselves. In another embodiment, the determination of image quality may also be based upon the "intended" relative distance or size as discussed above.

If the viewer data fits with the image quality parameters, then processing 300 continues to display image frames without additional processing at step 306. Otherwise, processing 300 adjusts the characteristics of the image at step 308.

In accordance with several embodiments set forth above, processing 300 may be performed from the standpoint of the system to a set of viewers taken as a whole, as in the case where the display device is the last point of image rendering before the image is received by the viewer. Alternatively, processing 300 may be performed from the standpoint of the system to each such viewer individually, as in the case of a theatre in which viewers may be wearing active glasses that may perform an intermediate image processing step between the screen and the viewer's eyes.

In addition, processing 300 may be done either at a variety of times—for example, processing 300 may be performed at a first time when e.g. the first image frame is rendered. Alternatively, processing 300 may be performed continuously throughout the period of time that images are being rendered. This may be desirable, for example, in the case where viewers in a theatre or at a home location may be moving around and reseating during the duration of a visual performance. In another embodiment, processing 300 may be performed on a segment of images where the perceived changes in image characteristics might be most pronounced—e.g. in lower or high brightness scenes or the like.

In yet another embodiment, processing 300 could be done at an intermediate point for a certain class of displays—e.g. for content intended to be distributed to cinemas, home theatres, or mobile devices. The intended target screen size could be embedded at that point as metadata. This could be done, for example, by a theatre distribution agency, or a television broadcaster, or a mobile network broadcaster.

It will be appreciated that the processing does not necessarily have to be done at the point of viewing the content—it could, for example, be done upstream. Alternatively, the processing could even be done at the studio where the content is created—for example, the studio could create a single version of the content, and then derive and archive three different versions intended for different screen sizes.

Image Compensation

Once it has been determined that it may be desirable to adjust the image, either at step 308 or otherwise by the system, then there are several embodiments that may be affected to change the characteristics of the image.

FIGS. 4A-4F shows 6 possible mappings that might be applied to change the image. Figures on the left hand side (i.e. FIGS. 4A, 4C, and 4E) are mappings that might be used to affect an increase in the brightness of the image. This brightness increase would be made by transitioning from a first luminance-related curve to a second luminance curve (as indicated by the arrows). Figures on the right hand side (i.e. FIGS. 4B, 4D and 4F) are mappings that might be used to affect a higher contrast image—wherein the arrows indicate the appropriate transition to make the image of higher contrast.

Figure 4:
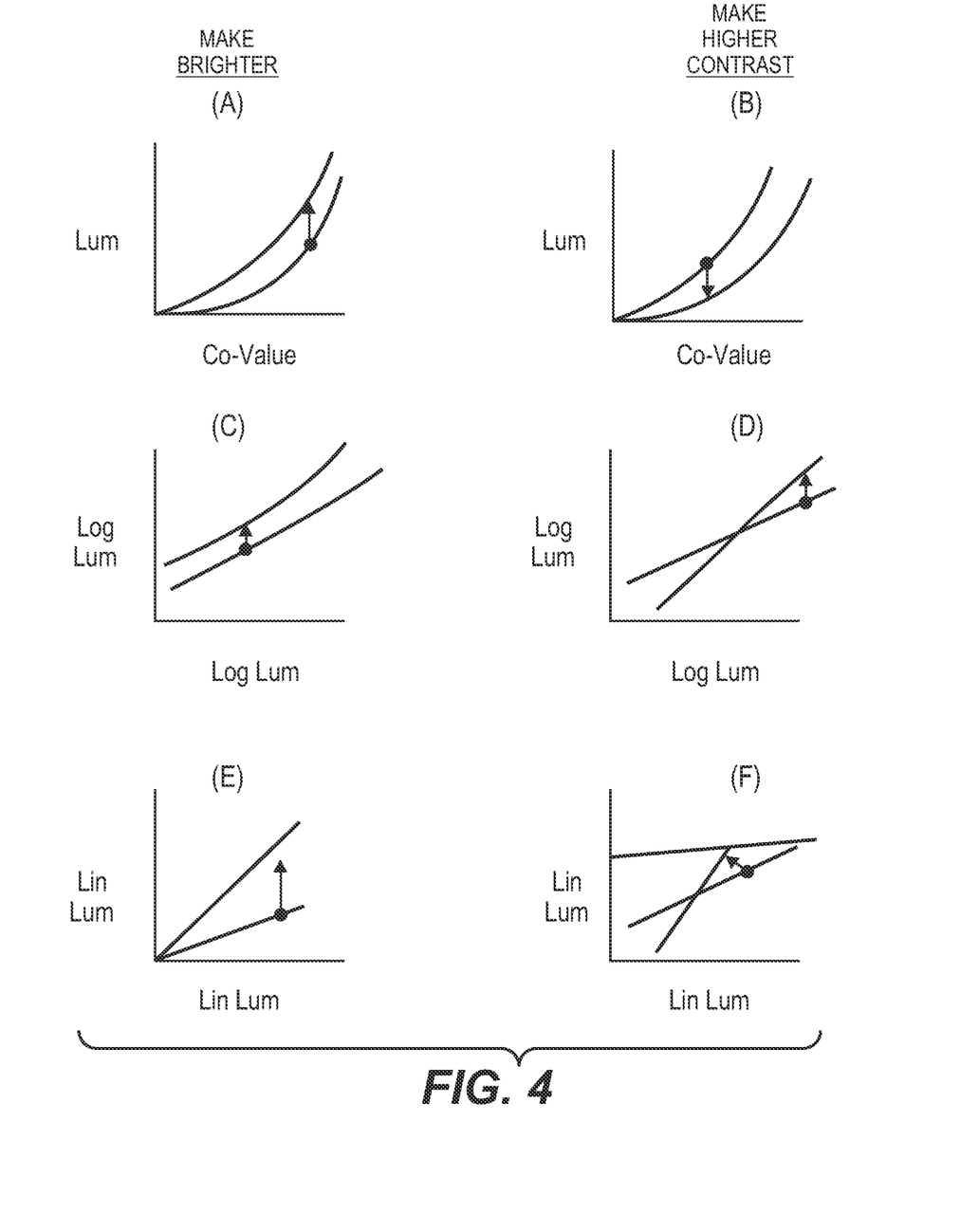
FIGS. 4A through 4F show a plurality of curves in that comprises various embodiments of image processing that adjust brightness and/or contrast according to viewer's distance from an image or viewer's visual angle of an image.

FIGS. 4A and 4B show the relevant curves as might be applied in a Luminance-code value space. FIGS. 4C and 4D show the relevant curves as might be applied in a Log luminance-Log luminance space. FIGS. 4E and 4F show the relevant curves as might be applied in Linear luminance-Linear luminance space. Each of the different space mappings may have their own particular desirability depending on designer or viewer requirements or tastes. For example, linear luminance space mappings may be desired for content creators for rendering in a post-production environment.

It should be appreciated that although the curves are labeled as "luminance" on the axes, the curves may actually be applied to each of the R,G,B color channels, for example. For example, the system could apply the curve just to Y (in YCbCr), or V in HSV, or L* in L*a*b*, etc. Alternatively, the system could apply the curves to each of RGB, LMS, etc. There are many possible alternative embodiments such as this.

As FIGS. 4A-4F above illustrate, brightness and contrast are two image characteristics that are amenable to control. In the case of brightness, brightness may be corrected by adding a constant offset in a perceptual domain (for example Log, Gamma, or L*). Contrast may be corrected by adjusting the slope (gain) in a perceptual domain. In one embodiment, the response function of a traditional gamma-based display can be characterized by $L=(aV+b)^g$, where V is the normalized input signal, a is the gain, b is the brightness, and g is the gamma or non-linear function. To increase the brightness, a is increased, and to increase the contrast, g is increased.

In another embodiment, a display incorporating an image processing module of the present application may have a sigmoidal function, as viewed on logarithmic (or other perceptual unit) axes. For one example, the image processing module may enforce a response function similar to:

$$Lout = \frac{c1 + c2(Lin)^n}{1 + c3(Lin)^n} \tag{Eq 1}$$

where $L_{out}$ is the output luminance, c1, c2, c3 are predetermined parameters, n is a slope or contrast, and Lin is the input luminance. For this type of response curve, to increase brightness increase c2. Contrast is increased by increasing n.

Figure 5:
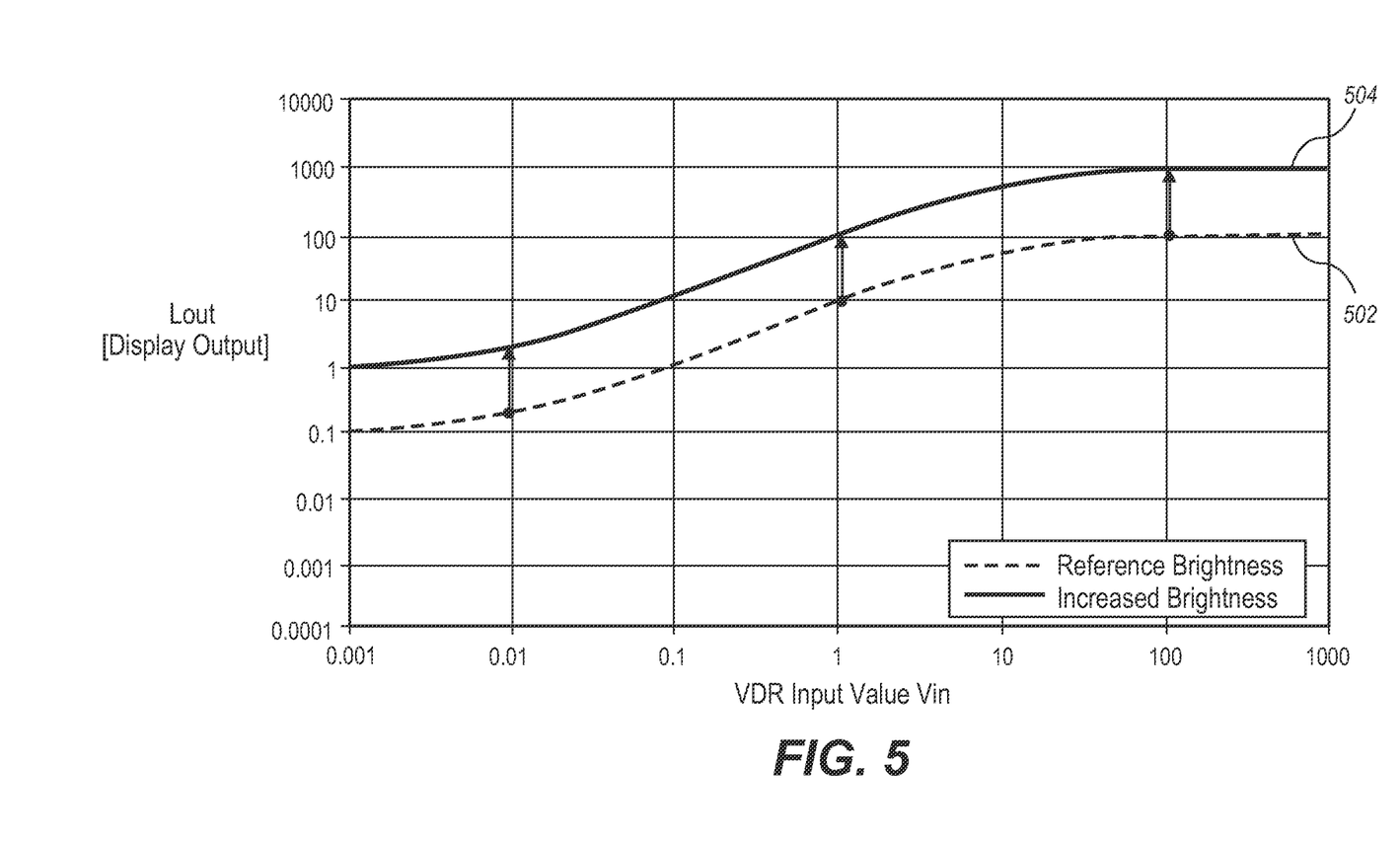
FIG. 5 shows one embodiment of an image processing system comprising the offset of a sigmoidal curve.

As can be seen in FIG. 5, increasing the brightness has the effect of uniformly raising the curve (from 502 to 504). This is the desired effect but may cause some input values to be beyond the capabilities of the display, and may raise black levels objectionably.

Figure 6:
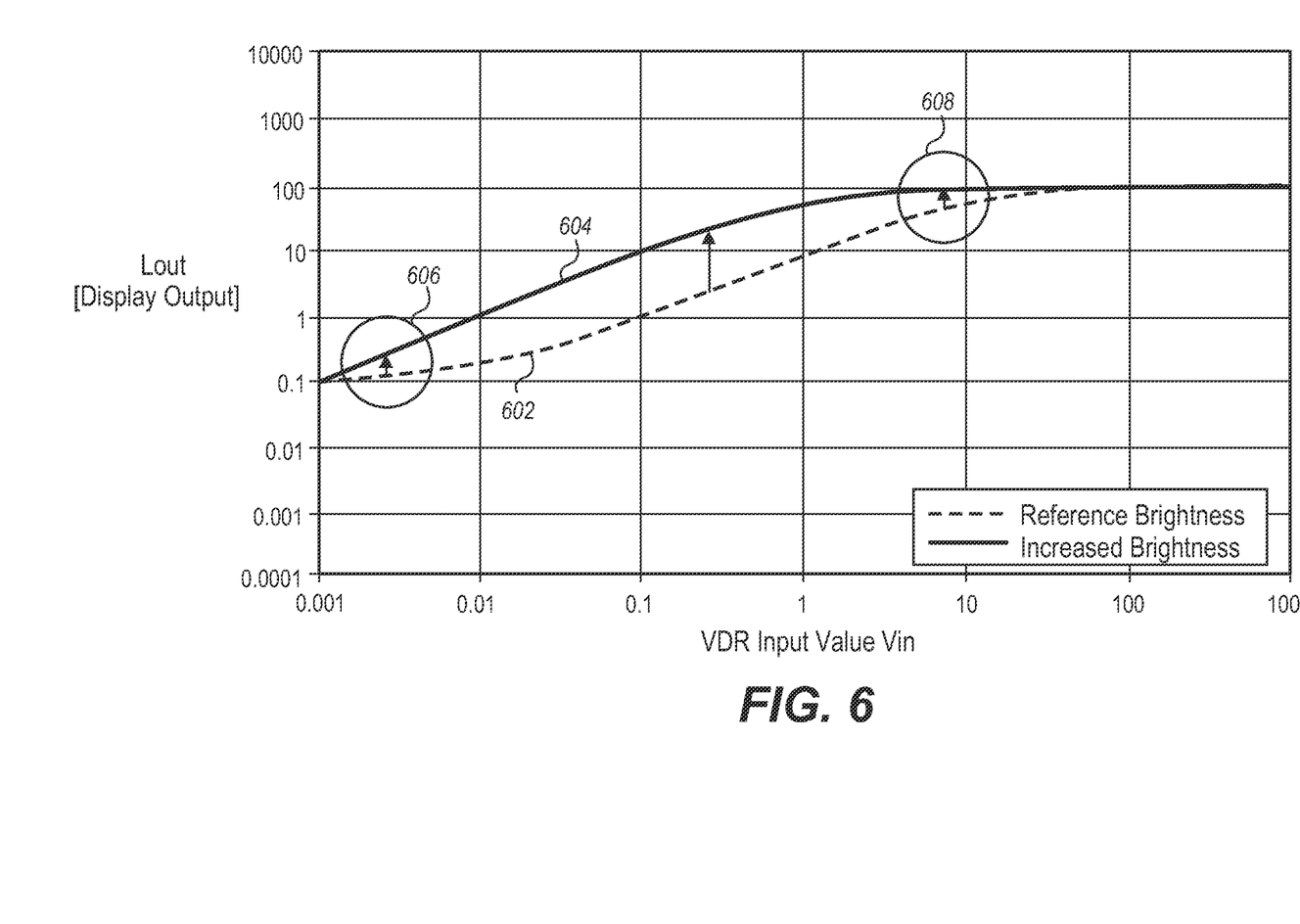
FIG. 6 show one embodiment of an image processing system comprising the displacement of a sigmoidal curve is clamped for low and high luminance values.

One alternative embodiment is to simply raise the midpoint of the display, while keeping the minimum and maximum values the same. This is shown in FIG. 6, and is accomplished by adjusting c2 as before, but then solving c1 and c3 to meet the display limitations. In this case, the curve may be mapped from curve 602 to 604 for example. As may be seen, low luminance regions 606 are held to the low values that may be renderable by the target display, thus tending to preserve a good dynamic range. Alternatively, high luminance regions 608 are limited to substantially the top luminance of the target display, thus potentially avoiding the need to abruptly clip peak luminance values.

Determination of Amount to Adjust

As seen in FIGS. 4A-4F, 5 and 6, there is an amount of offset, displacement, tilt in slope or the like (as the case may be) that determines the amount of change in luminance and/or contrast. This amount determines the relationship between adjustment of image characteristics based on the viewer's distance and/or visual angle of the image.

In one embodiment, the amount to adjust the luminance may be determined by the ratio of S/R. For a larger ratio of S/R, the brightness should be decreased to preserve appearance. This can be determined heuristically, experimentally or based on a model of the human visual system—and stored in a LUT, or computed as a function.

In another embodiment, the amount to adjust could also be determined by the ratio of Rref (i.e. the source relative size) to R (the target relative size). In this case, it may be desirable to compare either the ratio of Sref/Rref to S/R, or alternatively, Rref to R In this case, the following are a few functional forms, where alpha and beta are predetermined constants $a = alpha * Rref/R$ $a = alpha * (Rref/R)\wedge beta$ $c2 = alpha * Rref/R$ $c2 = alpha * (Rref/R)\wedge beta$ $a = alpha * (Sref/Rref)/(S/R)$ $c2 = alpha * (Sref/Rref)/(S/R)$ These apply if the system is using the curves described earlier to adjust the image according to screen size. Additionally, it may be desirable to couple the screen size adjustment with other color adjustments, in which case it may be desirable to determine the parameters based on other inputs as well as screen size. Generally, it would be desirable to pass the video unmodified if the source and target screen sizes are the same.

In another embodiment, there are possibly a multiple set of inputs to further consider in order to appropriately modify and/or adjust the image, such as the input image data, the source display parameters, and the target display parameters. Such source display parameters might include, for example, the relative size of the screen (or viewer distance and the like). It should be appreciated that the source and/or target display parameters could be assumed, defined, or given by metadata or the like.

In another embodiment, the amount to adjust contrast may be based on the spatial frequency of the image content. As one possible rule of thumb, both high and low spatial frequencies may be adjusted more than mid frequencies. This accounts for a viewer's estimated contrast sensitivity function. For example, for a larger ratio of S/R, low spatial frequencies should have increased contrast, and high spatial frequencies should have decreased contrast, in order to preserve appearance.

For one embodiment, the image may then be divided into different spatial frequencies in several ways: (1) perform a multi-scale decomposition or (2) transform into frequency domain by FFT or DCT. The contrast may then be adjusted based on a predetermined amount, which is calculated from a viewer's contrast sensitivity function, the frequency of the image data, and the ratio of S/R. The contrast adjustment can be performed on the luminance channel only, or on each of the color channels.

One Implementation Embodiment

Although the image processing systems and methods of the present application may be embedded anywhere within the image processing pipeline, one embodiment of the present system is to embed it inside a decoder—e.g. at the target display. This may be desirable as the various spatial frequencies may already be separated out, so such separation may be accomplished once or at least a number of times.

Figure 7:
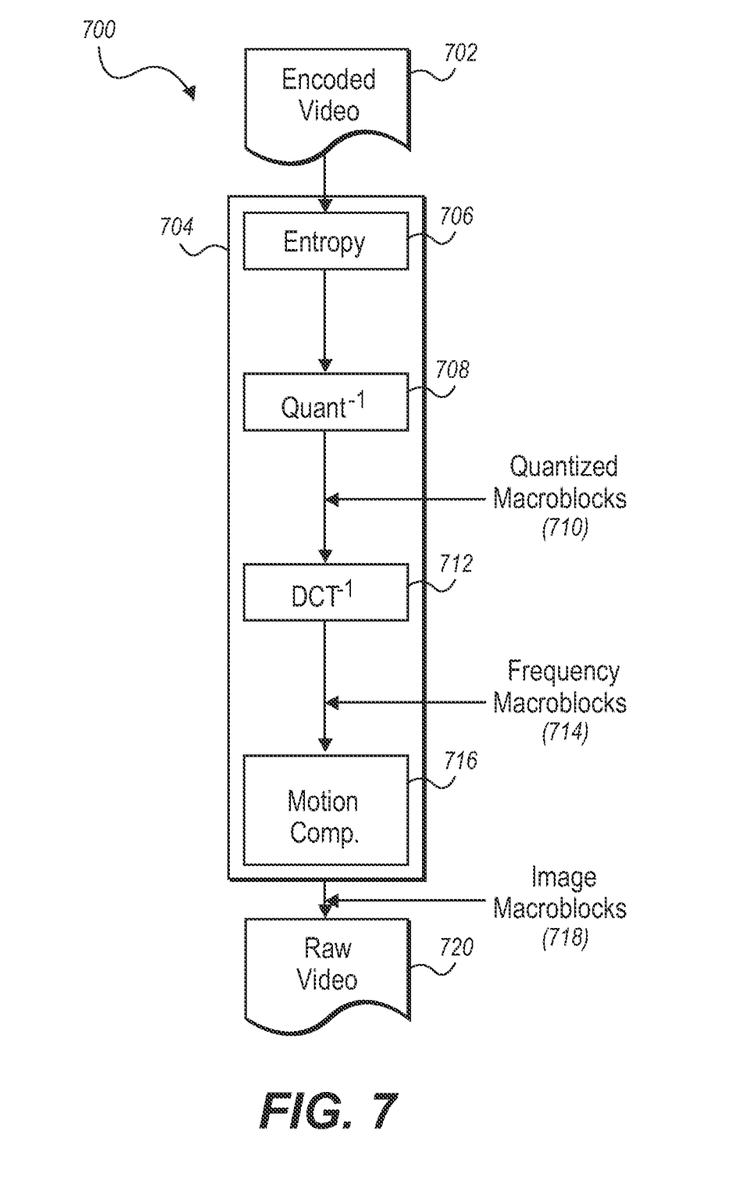
FIG. 7 shows one embodiment of an image processing pipeline made in accordance with the principles of the present invention.

FIG. 7 shows a high level architecture of a decoder (700). As may be seen, decoder 700 takes as input video signals 702 (encoded or otherwise) and passes that through entropy block 706, quantizer block 708, DCT block 712, and then through motion compensation block 716, before it is passed along as video output 720 as image macroblocks 718. As may also be seen, the output of quantizer 708 is quantized macroblocks 710 which are then converted into frequency macroblocks 714 by DCT block 712.

In one embodiment, an image correction module may be inserted in any of these modules to perform the luminance correction as described above and such correction may be performed on the DC component of any macroblock, and the contrast adjustments may be performed on the various quantized frequencies of any macroblock. These operations may be done on the "quantized macroblocks" or "frequency macroblocks" as shown in the simplified diagram of a video decoder in FIG. 7.

In various embodiments, the present invention is implemented in a dual or multi-modulation display. These displays could be a HDR and/or VDR display. In various embodiments, the display may comprise, for example, a modulated backlight that illuminates a front modulator and/or modulators. Luminance changes may be implemented by changes in energization (e.g., pulse width modulation) of individual backlight elements (e.g., a linear array of edge mounted LEDs or lighting elements directing light into an anisotropic diffuser and then towards the front modulator(s), or an n×m array of LEDs or lighting elements directly illuminating the front modulator(s)) in combination with luminance changes implemented at the front modulator/modulators. The changes in the front modulator may include, for example, changes in luminance or color to adjust the display as necessary to implement the invention. Since such illumination changes may in part be implemented by changes in a backlight element which increases or decreases brightness over a given segment of the front modulator(s), not all of which necessarily needs illumination change, the present invention includes compensation in the front modulator(s) in those areas that do not require additional (or less) illumination but are affected by the increased or decreased illumination of the backlight.

In various embodiments the present invention may be implemented in a 3D display or viewing system (e.g., cinema, advertising, billboards, computer displays, and displays of social network and related activities). In one embodiment, the calculations and adjustments provided by the present invention are calculated based on one channel of the 3D display and applied to both channels. In another embodiment, an average between the left and right channels of such displays is utilized. In yet another embodiment, separate calculations and luminance/color changes are performed for each channel.

In one embodiment, changes to the display are implemented in a pair of viewing glasses (e.g. passive or active 3D viewing glasses having an active LCD panel or lens for implementing the luminance and/or color changes). In such embodiments, each pair of glasses may receive wireless data for implementing the invention and each pair of glasses may include a location mechanism (e.g., ranging, triangulation, inertial data/measurements, GPS, etc.) to provide the distance from the screen or other information. The wireless data may be transmitted to the glasses from, for example, the display (e.g., capabilities built-into the display), a set top box, or another mechanism. Similarly, wireless data from the glasses (e.g., location information) may be transmitted to the display/set top box. In yet another embodiment, seat sensors or beam sensors on the wall could suffice as well.

The present invention includes sharing any and all information about a display, a program or image being viewed on the display, location information (e.g. from viewing glasses) over the Internet where database information, a remote server, and/or cloud computing may be utilized to perform any necessary calculations and transmit back to the display/set top box and/or glasses. Such transmissions may include for example, encryption for security and verification of copyrights.

A detailed description of one or more embodiments of the invention, read along with accompanying figures, that illustrate the principles of the invention has now been given. It is to be appreciated that the invention is described in connection with such embodiments, but the invention is not limited to any embodiment. The scope of the invention is limited only by the claims and the invention encompasses numerous alternatives, modifications and equivalents. Numerous specific details have been set forth in this description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The invention claimed is:

1. A method for changing at least one characteristics of an image, said image being displayed on a viewing screen, based upon the position data of at least one viewer of said viewing screen, the steps of said method comprising:
    obtaining information regarding viewer position in relation to the target display, the viewer position comprising viewer's distance from the viewing screen;
    determining if viewer position is within an acceptable range for current characteristics of the image displayed on the viewing screen further comprising:
        calculating the visual angle of the image displayed on the viewing screen as viewed by at least one viewer;
        determining the value of R as a function of S and d, where R is the relative screen size, S is the absolute horizontal screen size and d is the distance from screen to viewer;
        comparing the values of R and S associated with the viewer with a range of acceptable values for the images displayed on the target displays;
    determining a relative screen size to the viewer; and
    changing at least one characteristic of said image, if viewer position is not within an acceptable range, wherein said change is based upon the viewer's position, the viewer's distance from the viewing screen and the relative screen size to the viewer in relation to the viewing screen.

2. The method of claim 1 wherein the step of obtaining information regarding viewer position further comprises:
    detecting the position of at least one viewer of the viewing screen.

3. The method of claim 2 wherein the step of detecting the position of at least one viewer further comprises:
    detecting the infrared signal of at least one viewer.

4. The method of claim 2 wherein the step of detecting the position of at least one viewer further comprises:
    calculating the average distance of a plurality of viewers of the viewing screen.

5. The method of claim 2 wherein the step of detecting the position of at least one viewer further comprises:
    determining the distance of at least one viewers wearing active glasses.

6. The method of claim 5 wherein the step of determining the distance of at least one viewers wearing active glasses further comprises:
    communicating with the active glasses; and
    computing the position of the active glasses from the signals obtained from the communications with the active glasses.

7. The method of claim 1 wherein the step of determining if viewer position is within an acceptable range for current characteristics of the image displayed on the viewing screen further comprises:
    comparing the distance of at least one viewer with a range of acceptable distances for the images displayed on the viewing screens.

8. The method of claim 1 wherein the step of determining the value R further comprises:
    determining the value $R = a \tan(S/(2d))$, where R is the relative screen size, S is the absolute horizontal screen size and d is the distance from screen to viewer.

9. The method of claim 1 wherein the step of changing at least one characteristic of said image, if viewer position is not within an acceptable range, wherein said change is based upon the viewer's position in relation to the viewing screen further comprises:
    displacing the luminance curve in a suitable luminance space.

10. The method of claim 9 wherein the step of displacing the luminance curve in a suitable luminance space further comprises:
    providing an offset between a first luminance curve to produce a second luminance curve.

11. The method of claim 9 wherein the step of displacing the luminance curve in a suitable luminance space further comprises:
tilting the slope of a first luminance curve to produce a second luminance curve.

12. The method of claim 9 wherein said luminance curve is substantially a sigmoidal functional curve.

13. The method of claim 12 wherein said sigmoidal functional curve is substantially generated by the following function:

$$Lout = \frac{c1 + c2(Lin)^n}{1 + c3(Lin)^n}.$$

14. The method of claim 12 wherein said substantially sigmoidal curve is substantially displaced in the center portion of said substantially sigmoidal luminance curve and where said substantially sigmoidal curve is substantially clamped in the high and low luminance portions of said substantially sigmoidal curve.

15. The method of claim 9 wherein said luminance curve is substantially characterized by the following luminance function:
$L=(aV+b)^g$, wherein V is the normalized input signal, a is the gain, b is the brightness, and g is the gamma or non-linear function.

16. The method of claim 15 wherein the luminance is adjusted by adjusting the gain of the luminance function.

17. The method of claim 5 wherein the step of determining the distance of at least one viewers wearing active glasses further comprises:
communicating with one of a group, said group comprising: a seat sensor, a proximity detector and a wall sensor.

18. The method of claim 1 wherein the step of changing at least one characteristic of said image, if viewer position is not within an acceptable range, wherein said change is based upon the viewer's position in relation to the viewing screen further comprises:
adjusting the contrast of said image according to said viewer's visual angle of said image.

19. The method of claim 1 wherein the step of determining if viewer position is within an acceptable range further comprises:
determining the relative size of an intended source screen and the viewing screen.

20. The method of claim 18 wherein the step of determining the relative size of an intended source screen and the viewing screen further comprises:
inputting metadata that correlates to the relative size.

21. The method of claim 1 wherein step of determining if viewer position is within an acceptable range for current characteristics of the image displayed on the viewing screen further comprises:
assuming a standard distance from the viewing screen.

22. The method of claim 1 wherein step of determining if viewer position is within an acceptable range for current characteristics of the image displayed on the viewing screen further comprises:
inputting metadata that determines to the distance from the viewing screen.

23. A system for changing at least one characteristic of an image displayed on a target screen, wherein the image displayed on the target screen is viewed by users wearing active glasses, said system comprising:
a pair of active glasses, said active glasses configured to be worn by a viewer at a given distance and a relative screen size from the target screen, said target screen having an image formed thereon and viewed through said active glasses;
a communications module wherein said active glasses are in communications with said communications module for sending signals for determining said given distance of said viewer from said target screen;
a computing module, said computing module in communication with said active glasses and wherein said computing module computes said distance of said viewer, determine the value of R as a function of S and d, where R is the relative screen size, S is the absolute horizontal screen size and d is the distance from screen to viewer and compare the values of R and S associated with the viewer with a range of acceptable values for the images displayed on the target display; and
wherein further said computing module sending signals to said active glasses to alter at least one visual aspect of the image transmitted through said active glasses according to said given distance.

24. The method of claim 1 wherein the viewing screen comprises one of a movie theatre screen or a large home viewing screen.

25. The system of claim 23 wherein the computing module is further configured to calculate the visual angle of the image displayed on the viewing screen as viewed by at least one viewer.

* * * * *